United States Patent
Watts et al.

(10) Patent No.: US 6,202,397 B1
(45) Date of Patent: Mar. 20, 2001

(54) DRAPER BELT TENSIONING MECHANISM FOR A HARVESTING PLATFORM

(75) Inventors: Bradley James Watts, Eldridge, IA (US); David Walter Kmoch, Geneseo, IL (US); Thomas G. Teller, Faribault; Jay T. Hulscher, Golden Valley, both of MN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/321,327

(22) Filed: May 27, 1999

(51) Int. Cl.$^7$ .................................................. A01D 57/00
(52) U.S. Cl. ............................................. 56/208; 56/14.5
(58) Field of Search ...................... 198/813, 814, 198/816; 460/20, 18, 70; 56/181, 208, 192, 14.5

(56) References Cited

U.S. PATENT DOCUMENTS

| | | |
|---|---|---|
| 2,631,421 | 3/1953 | Pierce . |
| 2,762,183 | 9/1956 | Linscheid . |
| 3,694,068 * | 9/1972 | Jordan ........................................ 355/3 |
| 4,077,073 * | 3/1978 | Koll et al. ............................... 5/81 R |
| 4,340,377 * | 7/1982 | Johnson et al. ......................... 474/81 |
| 4,362,005 | 12/1982 | Hanaway . |
| 4,369,617 * | 1/1983 | Hanaway et al. ...................... 56/14.6 |
| 4,421,228 * | 12/1983 | Marsiglio et al. .................... 198/814 |
| 4,561,538 * | 12/1985 | Zwiebel ................................ 198/816 |
| 4,566,069 * | 1/1986 | Ogden ..................................... 272/69 |
| 4,653,634 * | 3/1987 | Hansen .................................. 198/813 |
| 4,803,804 * | 2/1989 | Bryant .................................... 474/113 |
| 4,938,010 * | 7/1990 | Guinn et al. ............................ 56/181 |
| 4,995,506 * | 2/1991 | Langenbacher et al. ............. 198/814 |
| 5,022,514 * | 6/1991 | Lofberg ................................. 198/813 |
| 5,136,832 * | 8/1992 | Sund ....................................... 56/364 |
| 5,177,944 | 1/1993 | Finlay . |
| 5,240,461 * | 8/1993 | Hohnl .................................... 474/101 |
| 5,302,162 * | 4/1994 | Pasero ..................................... 482/54 |
| 5,307,920 * | 5/1994 | Meyer et al. ......................... 198/335 |
| 5,329,800 * | 7/1994 | Herdzina et al. ....................... 72/361 |
| 5,464,371 * | 11/1995 | Honey ..................................... 460/20 |
| 5,482,266 * | 1/1996 | Takemoto et al. .................... 271/272 |
| 5,609,238 * | 3/1997 | Christensen .......................... 198/583 |
| 5,632,372 * | 5/1997 | Steinbuchel, IV et al. ......... 198/813 |
| 5,797,481 * | 8/1998 | Uber et al. ............................ 198/813 |
| 5,895,332 * | 4/1999 | Olson et al. .......................... 474/113 |
| 5,934,449 * | 8/1999 | Dolan .................................... 198/853 |
| 5,984,083 * | 11/1999 | Hosch et al. ...................... 198/810.04 |

FOREIGN PATENT DOCUMENTS

| | | |
|---|---|---|
| 89 5738 | 2/1945 | (FR) . |
| 11 79060 | 5/1959 | (FR) . |
| 1574033 | 9/1980 | (GB) . |

OTHER PUBLICATIONS

Huber: "Einstellvorrichtung Zum Spannen von Fordertuchern, Insbesondere fur Landwirtschaftliche Maschinen", Bd. 15, Nr. May 5, 1965.

* cited by examiner

*Primary Examiner*—Thomas B. Will
*Assistant Examiner*—Arpad Fabian Kovacs

(57) ABSTRACT

A draper belt tensioning mechanism for a harvesting platform includes a linkage having a bell crank coupled to the belt idler roller to move the idler roller away from the drive roller when the bell crank is rotated to tension the draper belt. A strut coupled to the bell crank and a spring biasing the strut produces the force to tension the belt. The linkage, except for the spring, is enclosed within the belt envelope. A spring gauge is positioned adjacent the spring to readily determine if the spring is compressed to the desired length. In a preferred embodiment, the spring and gauge are located to be visible by a machine operator.

15 Claims, 4 Drawing Sheets

DRAPER BELT TENSIONING MECHANISM FOR A HARVESTING PLATFORM

BACKGROUND OF THE INVENTION

1. Field of the Invention

The present invention relates to a draper harvesting platform and in particular to a tensioning mechanism for a draper belt.

2. Description of Related Art

Draper platforms for harvesting equipment have a flat, wide belt, referred to as a draper or draper belt to convey crop material. The arrangement and number of belts vary among platforms. One style of draper platform has two side belts that convey crop material laterally, to the center of the platform, where a center feed belt moves the crop material longitudinally into a harvesting machine. Each belt is wrapped around a pair of rollers, one being a drive roller and the other being an idler roller. It is necessary to maintain a predetermined amount of tension within the draper belt for proper functioning. A minimum tension is needed to prevent slippage of the belt on the drive roller while excess tension in the belt reduces the life of the belt.

One type of tensioning mechanism utilizes cables and pulleys to position the idler roller. Once positioned, the idler roller is secured in place. Each time the belt needs adjustment, the operator must release the idler roller, re-position the idler roller and then re-secure the idler roller. Adjustment of the belt tension is periodically needed, especially with a new draper belt as the belt stretches during the first few hours of operation. Adjustment of the belt tension is also necessary due to varying crop conditions. A heavy crop load may require a higher belt tension to prevent slippage. With a tensioning system that requires the idler roller to be secured in place, adjustment is a time consuming process and there may not be a clear means of determining if the tension is correct.

SUMMARY OF THE INVENTION

It is an object of the present invention to provide a draper belt tensioning mechanism for a harvesting platform that is simple in construction yet reliable in maintaining the proper tension.

It is a further object of the invention to provide a tensioning mechanism that is easily adjusted.

It is a feature of the invention to provide an active tensioning mechanism in which the idler roller is not secured in place but is always biased by the tensioning mechanism. It is an advantage of the active tensioning mechanism that the idler roller can move to maintain the tension in the event the belt is acted on by an outside force that causes movement of the idler roller.

The tensioning mechanism of the present invention includes a linkage having a bell crank coupled to the idler roller. A compression spring operates through a strut to rotate the bell crank to move the idler roller away from the drive roller to tension the draper belt. The idler roller is supported in slide brackets enabling the compression spring to always bias the idler roller away from the drive roller. A single bolt maintains the compression of the spring. Belt tension is adjusted by simply turning the bolt to compress or relieve the spring.

It is another feature of the invention that the linkage is disposed within the envelope enclosed by the draper belt. In this location, the mechanism is generally free from dirt and debris and is relatively protected from damage. The compression spring and bolt are disposed outside the draper belt envelope in a location easily accessible for adjusting the belt tension.

It is still another feature of the present invention to provide a spring gauge in the form of a weld plate extending alongside the compression spring to indicate the proper length for the spring to produce the recommended tension in the draper belt. Where possible, the spring and spring gauge are located in a position where they are visible from the operator's cab of the harvesting machine associated with the platform. This enables the operator to determine the belt tension without leaving the cab.

DESCRIPTION OF THE PREFERRED EMBODIMENT

Figure 1:
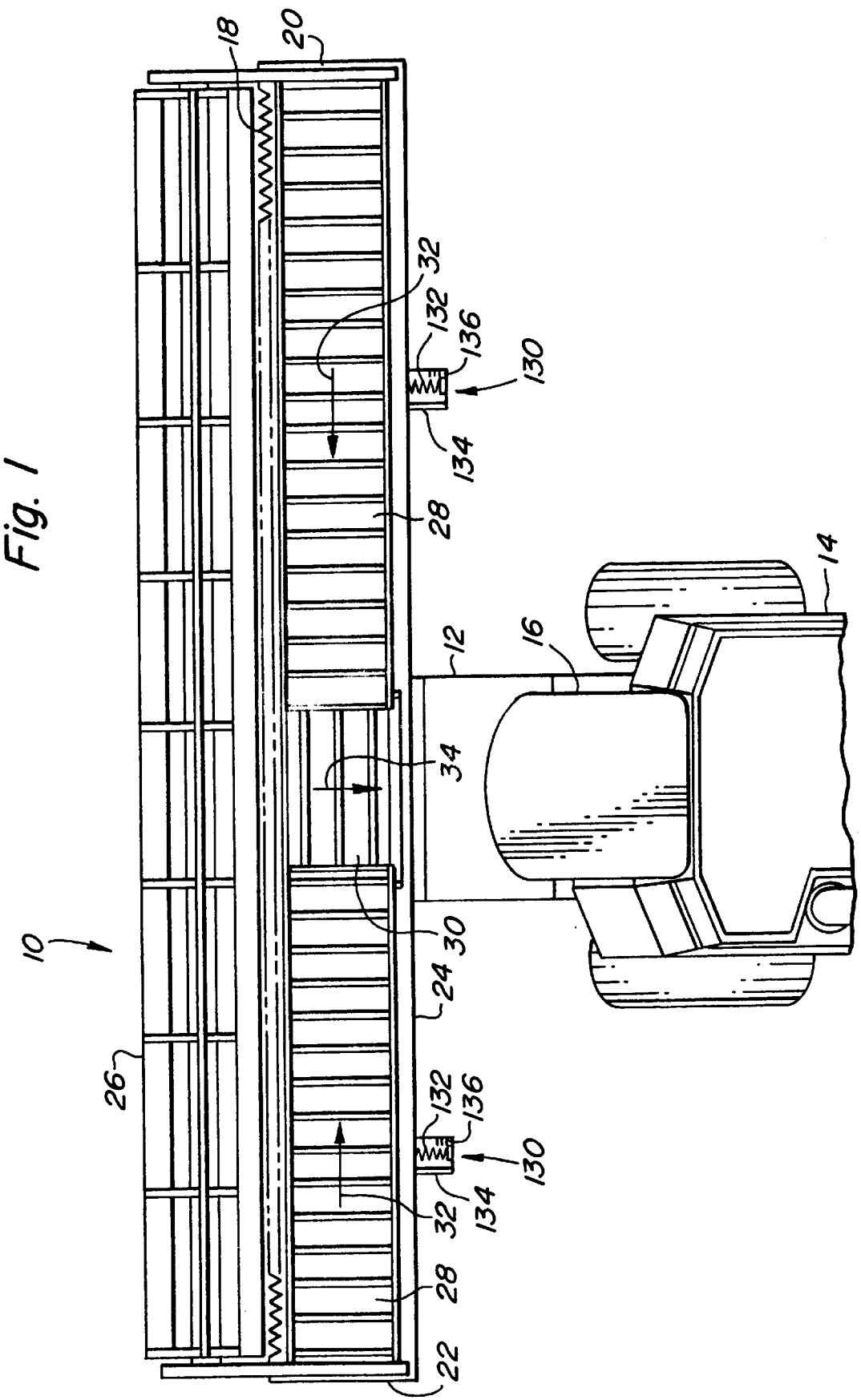
FIG. 1 is a top view of a draper platform containing the tensioning mechanism of the present invention.

The draper belt tensioning mechanism of the present invention is embodied in a grain cutting platform 10 shown in FIG. 1. The platform 10 is attached to the feederhouse 12 of a combine 14. The combine 14 includes an operator's cab 16. The draper belt tensioning mechanism of the present invention can be used in draper platforms for other types of harvesters, such as windrowers.

The platform 10 includes a cutterbar 18, spaced side sheets 20, 22 and a rear wall 24. A reel 26 rotates above the cutterbar 18 to hold the crop material against the cutterbar and move the cut crop material onto two side draper belts 28 and a center feed draper belt 30. The two side draper belts 28 move the crop material laterally toward the center feed draper belt 30 as shown by the arrows 32. The center feed draper belt moves the crop material longitudinally rearward into the feederhouse 12 as shown by the arrow 34. Each of the draper belts rotates around a pair of rollers, a drive roller and an idler roller, as described below.

Figure 2:
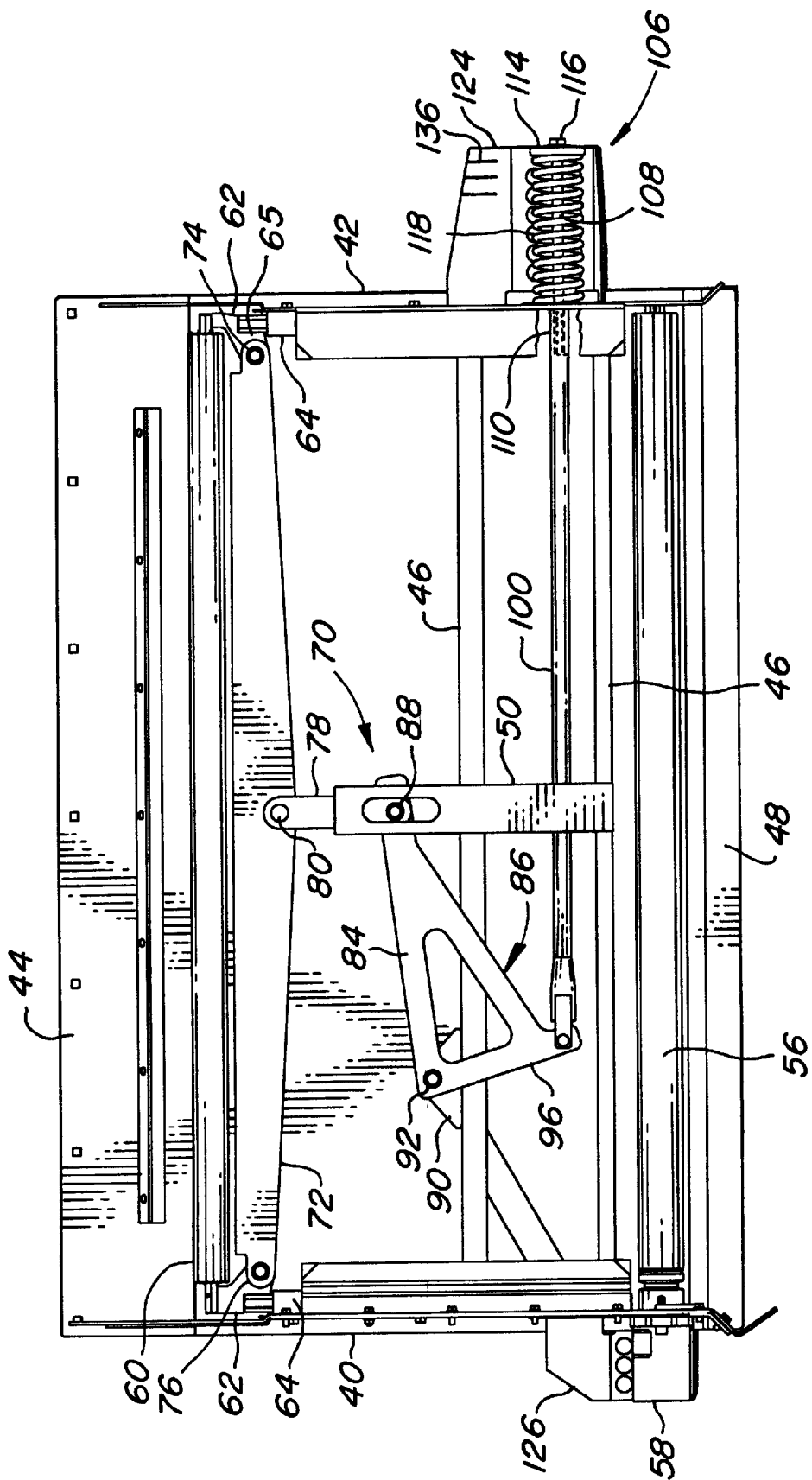
FIG. 2 is a top view of the tensioning mechanism for one of the draper belts in the platform shown in FIG. 1.

With reference to FIG. 2, the draper belt tensioning mechanism of the present invention is shown. The tensioning mechanism shown is for the center feed draper belt 30. However, the belt tensioning mechanisms are the same for all three draper belts in the platform 10. The platform frame structure includes side members 40, 42 along the side the belt 30. A cutterbar mounting cross member 44 is located at the forward ends of the two side members 40, 42. Intermediate cross members 46 also extend between the two side members 40 and 42, as does the rear cross member 48. The intermediate cross members 46 support a center frame member 50 that is generally parallel to the side members 40, 42. The center frame member 50 provides center support to the draper belt 30 and a place for the operator to step if needed to reach various parts of the platform.

A drive roller 56 is rotatably carried by the side members 40, 42. A hydraulic motor 58 rotates the drive roller. An idler roller 60 extends between the side members 40, 42, near the cutterbar mounting cross member 44. The idler roller is mounted to a pair of slide brackets 62 that are slidably carried in channel members 64 on each of the two side members 40, 42. The channel members 64 are described in greater detail below. The slide brackets and channel members enable the idler roller 60 to move toward or away from the drive roller.

A belt tensioning mechanism 70 is provided to urge the idler roller 60 away from the drive roller 56, to produce a desired tension in the draper belt 30. The tensioning mechanism includes a tensioning bar 72 that is mounted at its ends 74 and 76 to the slide brackets 62. A slider 78 is coupled to the center of the tensioning bar 72 by a pin 80. The slider 78 is also coupled to one arm 84 of a bell crank 86 by a pin 88. The bell crank 86 is rotatably mounted to one of the cross members 46 through a flange 90 and pin 92. The other arm 96 of the bell crank is pinned to a strut 100. Rotation of the bell crank 86 about the pin 92 causes the slider 78 and tensioning bar 72 to move toward or away from the drive roller 56.

Figure 3:
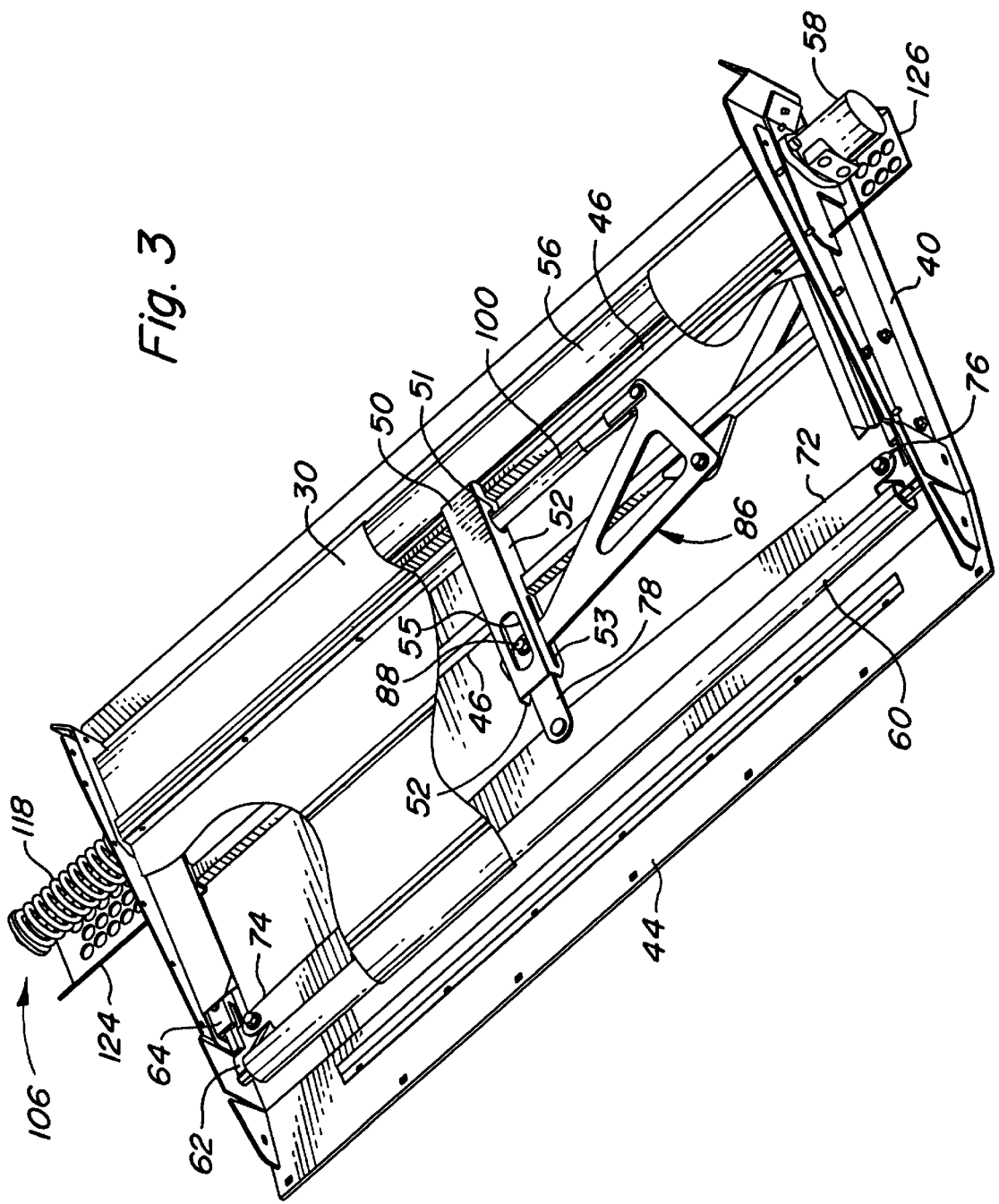
FIG. 3 is a perspective view of the tensioning mechanism shown in FIG. 2.

With reference to FIG. 3 it can be seen that the center frame member 50 is generally U-shaped. Apertures 51 in the side walls 52 of the center frame member 50 enable the strut 100 to pass through. The arm 84 of the bell crank passes through slots 53 in the side walls 52. The center frame member thus provides support to the end of the crank arm 84. Access opening 55 in the top of the center frame member 50 allows the crank arm 84 and the slider 78 to be connected by the pin 88.

A biasing mechanism 106 is connected to the strut 100 to tension the strut. This urges the bell crank to rotate and push the idler roller 60 away from the drive roller 56, thus applying tension to the draper belt 30. The biasing mechanism 106 includes a bolt 108 threaded into the end 110 of the strut 100. The bolt 108 extends outward beyond the side member 42. A large washer 114 is placed against the bolt head 116. A compression spring 118 is placed between the washer 114 and the side member 42. The compression spring applies a force to the bolt 108 and strut 100, creating tension in the strut, thereby rotating the bell crank to push the idler roller away from the drive roller and apply tension to the draper belt 30. The bolt 108 can be threaded further into the strut 100 to further compress the spring 118 and increase the tension in the strut 100 and the tension in the draper belt 30. Likewise, the bolt 108 can be rotated out of the strut end to reduce the compression of the spring and reduce the tension in the draper belt. The tensioning mechanism is an active mechanism that always maintains the tension in the draper belt. The idler roller is always biased by the spring and is always able to move to tension the belt. In the event the belt is acted on by an outside force, such as an impact, causing the idler roller to move, the active tensioning enables the roller to return the belt to the proper tension.

A spring gauge 124 is attached to the side member 42 and projects outwardly therefrom, adjacent the spring 118. When the spring is compressed to a length equal to the length of the gauge 124, the spring produces the desired tension in the belt 30. For the center feed draper belt, the spring 118 and spring gauge 124 are located on the bottom of the platform 10. The gauge 124 is a welded plate that also functions as a skid plate to protect the spring and bolt from damage caused by striking rocks or other objects on the ground. A skid plate 126 is also provided to protect the hydraulic motor 58.

Figure 4:
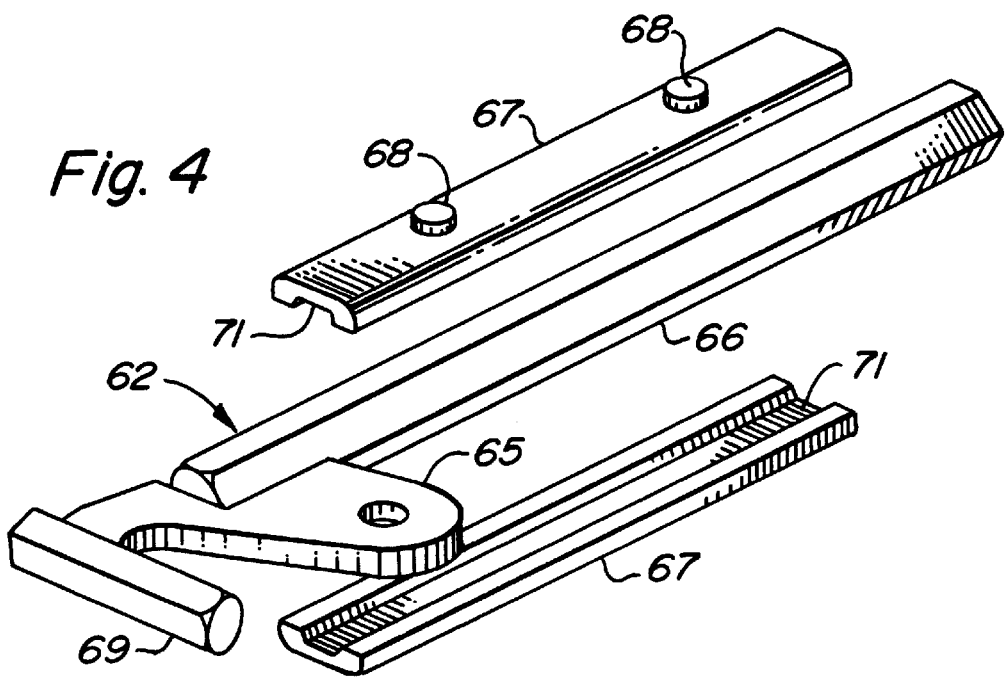
FIG. 4 is an exploded perspective view of the slide bracket and sleeves for mounting the idler roller for movement to tension the draper belt.
Figure 5:
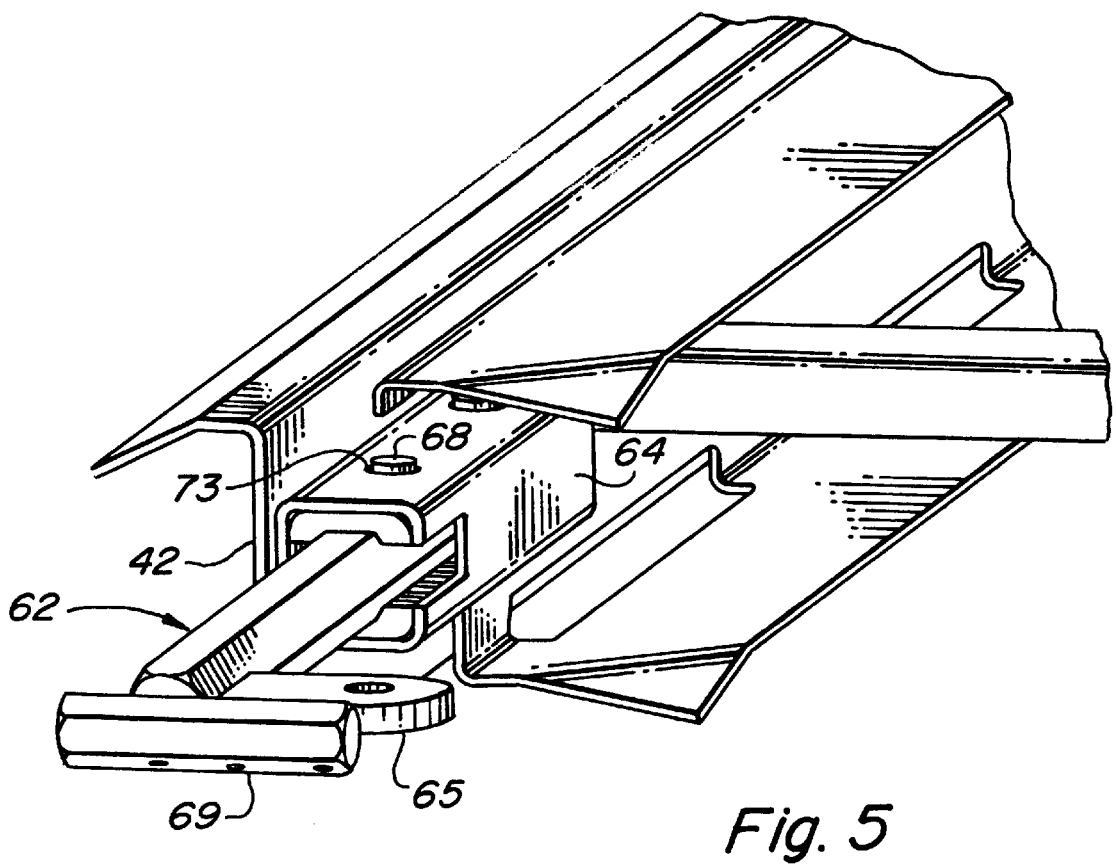
FIG. 5 is a perspective view of the slide bracket assembled in the slide channel for mounting of the idler roller.

The slide bracket 62 and channel member 64 are shown in greater detail in FIGS. 4 and 5. The slide bracket includes a flange 65 to which the tensioning bar 72 is pinned. A hex shaped slide rod 66 extends longitudinally along the side member 42 and within the channel member 64. A transverse stud 69 rotatably carries the idler roller 60. The channel member 64 is attached to the side member 42. The channel member 64 is a square tube with a pair of plastic bushing halves 67 therein. The bushing halves 67 are contoured on their inner surfaces 71 to match the hex shape of the rod 66 of the slide bracket 62. The outer surfaces of the bushing halves 67 mate with the interior of the channel member 64. The bushing halves 67 have projecting studs 68 that extend through apertures 73 in the channel member 64 to hold the bushing halves in place within the channel member. When the shaft 66 is inserted between the bushing halves, the studs can not be removed from the apertures in the channel member and thus retain the bushing halves in place. The rod 66 slides within the bushing halves as the idler roller moves toward or away from the drive roller. The bushing halves are preferably made of a low friction polymer such as Delrin Acetal resin to promote sliding of the bracket 62 within the channel member 64. Identical slide brackets 62 and channel members 64 are provided at both ends of the idler roller.

The tensioning mechanism 70 is contained within the envelope of the draper belt 30 except for the biasing mechanism 106, which extends beyond the side member 42. Identical tensioning mechanisms are provided for the two side draper belts 28. The lengths of the slider 78 and the center frame member 50 will vary for other draper belts, depending on the length of the belts. In all other respects, the tensioning mechanisms are the same. The tensioning mechanisms for these belts include biasing mechanisms 130 that extend rearward from the platform rear wall 24. The biasing mechanisms 130 each include a spring 132 and a spring gauge 134 projecting from the rear wall 24 alongside the spring. Preferably, the springs 132 and the gauges 134 are located in positions that are visible to an operator in the operator's cab 16 of the associated combine or other harvesting equipment. This positioning of the springs enables the operator to readily determine if the tension of the draper belts 28 has changed. The spring gauges 124, 134 may be equipped with indicia 136 showing degrees of greater tension to assist the operator when increasing the belt tension due to heavier crop loads.

Variations may be made to the draper tensioning device. For example, the side members 40, 42 may be part of a separate frame for the draper belt itself and not part of the platform frame. Therefore, the invention should not be limited to the above-described embodiment, but should be limited solely to the claims that follow.

We claim:

1. A harvesting platform comprising:
   a frame having spaced elongated side members;
   draper belt drive and idler rollers spanning between the frame side members;
   a draper belt wrapped around the drive and idler rollers for conveying crop material in a belt drive direction;
   a drive motor associated with the drive roller for turning the drive roller;
   a slide mount coupling the idler roller to the frame side members enabling the idler roller to move in the direction of belt travel toward and away from the drive roller; and
   a tensioning mechanism acting on the idler roller to urge the idler roller away from the drive roller to tension the draper belt, the tension mechanism including a linkage having a bell crank disposed within the draper belt coupled to the idler roller to move the idler roller when the bell crank is rotated, a strut coupled to the bell crank and a spring biasing the strut to rotate the bell crank wherein the force of the spring urges the idler roller away from the drive roller to tension the draper belt.

2. The harvesting platform as defined by claim 1 wherein the slide mount includes a slide bracket carried by each side member of the frame, the slide brackets supporting the idler roller, the slide brackets being movable relative to the frame in the belt drive direction and further comprising a tensioning bar between the bell crank and the slide brackets wherein the idler roller is moved in response to rotation of the bell crank.

3. The harvesting platform as defined by claim 2 wherein the bell crank is coupled to the center of the tensioning bar between the two slide brackets.

4. The harvesting platform as defined by claim 2 further comprising a slide bar between the bell crank to the tensioning bar.

5. The harvesting platform as defined by claim 1 further comprising an adjusting mechanism to change the compression of the spring to change the tension in the draper belt.

6. The harvesting platform as defined by claim 5 wherein the adjusting mechanism includes a bolt and washer capturing the spring between the washer and the frame side member wherein rotation of the bolt varies the length of the spring.

7. A harvesting platform comprising:

a frame having spaced elongated side members;

draper belt drive and idler rollers spanning between the frame side members;

a draper belt wrapped around the drive and idler rollers for conveying crop material in a belt drive direction;

a drive motor associated with the drive roller for turning the drive roller;

a slide mount coupling the idler roller to the frame side members enabling the idler roller to move in the direction of belt travel toward and away from the drive roller; and a tensioning mechanism acting on the idler roller to urge the idler roller away from the drive roller to tension the draper belt, the tension mechanism including a linkage having a bell crank coupled to the idler roller to move the idler roller when the bell crank is rotated, a strut coupled to the bell crank and extending outward beyond one of the frame side members and a spring outside of the frame biasing the strut to rotate the bell crank wherein the force of the spring urges the idler roller away from the drive roller to tension the draper belt.

8. The harvesting platform as defined by claim 7, further comprising a spring gauge projecting from the frame adjacent the spring to visually determine the length of the spring.

9. The harvesting platform as defined by the claim 8 further comprising indicia on the spring gauge to show degrees of greater tension.

10. The harvesting platform as defined by claim 8 wherein the spring and the spring gauge project rearwardly from the platform frame.

11. A harvesting platform comprising:

a frame having spaced elongated side members;

draper belt drive and idler rollers spanning between and being carried by the frame side members;

a draper belt wrapped around the drive and idler rollers for conveying crop material in a belt drive direction;

a drive motor associated with the drive roller for turning the drive roller;

a slide mount at the ends of one of the rollers to couple the one roller to the frame side members and to enable the one roller to move in the direction of belt travel toward and away from the other of the rollers; and an active tensioning mechanism acting on the one roller to urge the one roller away from the other roller to tension the draper belt, the tensioning mechanism including a linkage disposed within the draper belt and acting on the slide mounts at the ends of the one roller, the tensioning mechanism having a strut disposed within the draper belt with an end portion extending outward beyond one of the frame side members and a spring disposed outside of the frame and co-acting with the strut to apply a biasing force to the one roller to tension the draper belt.

12. The harvesting platform as defined by claim 11 wherein the linkage includes a tensioning bar coupled to the slide mounts at the ends of the one roller with the linkage connected to the tension bar intermediate the ends of the one roller whereby the linkage acts through the tension bar to move both ends of the one roller away from the other roller.

13. The harvesting platform as defined by claim 12 wherein the spring is a single compression spring surrounding the end portion of the strut extending outward beyond the frame.

14. The harvesting platform as defined by claim 11 wherein the linkage includes a bell crank disposed within the draper belt.

15. A harvesting platform comprising:

a frame having spaced elongated side members;

draper belt drive and idler rollers spanning between the frame side members;

a draper belt wrapped around the drive and idler rollers for conveying crop material in a belt drive direction;

a drive motor associated with the drive roller for turning the drive roller;

a slide mount coupling the idler roller to the frame side members enabling the idler roller to move in the direction of belt travel toward and away from the drive roller; and a tensioning mechanism acting on the idler roller to urge the idler roller away from the drive roller to tension the draper belt, the tensioning mechanism including a bias mechanism to continually apply a force to the idler roller to move the idler roller away from the drive roller to tension the draper belt whereby the idler roller will return the draper belt to a desired tension after the belt has been acted on by an outside force that caused the idler roller to move, the tensioning mechanism further including a linkage having a bell crank coupled to the idler roller to move the idler roller when the bell crank is rotated, a strut couple to the bell crank and a spring biasing the strut to rotate the bell crank wherein the force of the spring urges the idler roller away from the drive roller to tension the draper belt.

* * * * *